US012711745B2

(12) United States Patent
Cai et al.

(10) Patent No.: US 12,711,745 B2
(45) Date of Patent: Aug. 18, 2026

(54) DYNAMIC TEMPORAL NORMALIZATION FOR DEEP LEARNING IN VIDEO UNDERSTANDING APPLICATIONS

(71) Applicant: Intel Corporation, Santa Clara, CA (US)

(72) Inventors: Dongqi Cai, Beijing (CN); Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 18/563,305

(22) PCT Filed: Sep. 1, 2021

(86) PCT No.: PCT/CN2021/115902
§ 371 (c)(1),
(2) Date: Nov. 21, 2023

(87) PCT Pub. No.: WO2023/028908
PCT Pub. Date: Mar. 9, 2023

(65) Prior Publication Data

US 2024/0273873 A1 Aug. 15, 2024

(51) Int. Cl.
*G06V 10/00* (2022.01)
*G06V 10/32* (2022.01)
(Continued)

(52) U.S. Cl.
CPC .......... *G06V 10/7715* (2022.01); *G06V 10/32* (2022.01); *G06V 10/82* (2022.01)

(58) Field of Classification Search
CPC .... G06V 10/7715; G06V 10/32; G06V 10/82; H04N 19/00; G06N 3/0442; G06N 3/0985; G06N 3/0464
See application file for complete search history.

(56) References Cited

U.S. PATENT DOCUMENTS 10,325,185 B1 6/2019 Kim et al.
2019/0228298 A1 7/2019 Suzuki et al.
(Continued)

FOREIGN PATENT DOCUMENTS

CN 111476082 7/2020
CN 111476082 A 7/2020
(Continued)

OTHER PUBLICATIONS

Kim et al., Revisiting Batch Normalization for Training Low-Latency Deep Spiking Neural Networks from Scratch, arXiv: 2010.01729v2 Oct. 27, 2020.*

(Continued)

*Primary Examiner* — Xiao Liu
(74) *Attorney, Agent, or Firm* — Hanley, Flight & Zimmerman, LLC

(57) ABSTRACT

Techniques related to application of deep neural networks to video for video recognition and understanding are discussed. A feature map of a deep neural network for a current time stamp of input video is standardized to a standardized feature map and pooled to a feature vector. The feature vector and transform parameters for a prior time stamp are used to generate transform parameters for the current time stamp based on application of a meta temporal relay. The resultant current time stamp transform parameters, such as a hidden state and a cell state of the meta temporal relay, are used to transform the standardized feature map to a normalized feature map for use by a subsequent layer of the deep neural network.

17 Claims, 8 Drawing Sheets

(51) Int. Cl.

| | |
|---|---|
| ***G06V 10/77*** | (2022.01) |
| ***G06V 10/82*** | (2022.01) |

(56) References Cited

U.S. PATENT DOCUMENTS

| | | | | |
|---|---|---|---|---|
| 2019/0325315 | A1 * | 10/2019 | Ioffe | G06N 3/0442 |
| 2020/0184606 | A1 | 6/2020 | Elron | |

FOREIGN PATENT DOCUMENTS

| | | | |
|---|---|---|---|
| CN | 112508125 | 3/2021 | |
| CN | 112508125 A | 3/2021 | |
| CN | 113256506 | 8/2021 | |
| CN | 113256506 A | 8/2021 | |
| WO | 2018148526 | 8/2018 | |
| WO | 2018148526 A1 | 8/2018 | |
| WO | WO-2022111506 A1 * | 6/2022 | G06N 3/047 |

OTHER PUBLICATIONS

International Search Report and Written Opinion for PCT Application No. PCT/CN2021/115902, dated May 31, 2022.

Carreira, et al., "Quo Vadis, Action Recognition? A New Model and the Kinetics Dataset", arXiv:1705.07750v3 [cs.CV] Feb. 12, 2018, 10 pgs.

He, et al., "Deep Residual Learning for Image Recognition", arXiv:1512.03385v1 [cs.CV} Dec. 10, 2015, 12 pgs.

Ioffe, et al., "Batch Normalization: Accelerating Deep Network Training by Reducing Internal Covariate Shift", arXiv: 1502.03167v3 [cs.LG] Mar. 2, 2015, 11 pgs.

Jiang, et al., "STM: Spatio Temporal and Motion Encoding for Action Recognition", arXiv:1908.02486v2 [cs.CV] Aug. 16, 2019, 10 pgs.

Kim, Y., et al., "Revisiting Batch Normalization for Training Low-Latency Deep Spiking Neural Networks from Scratch", arXiv:2010.01729v1, Oct. 5, 2020.

Lel Ba, et al., "Layer Normalization", arXiv:1607.0645vl [stat.ML] Jul. 21, 2016, 14 pgs.

Qiu, et al., "Learning Spatio-Temporal Representation with Pseudo-3D Residual Networks", arXiv:1711.10305v1 [cs.CV] Nov. 28, 2017, 9 pgs.

Tran, et al., "A Closer Look at Spatiotemporal Convolutions for Action Recognition", arXiv;1711.11248v3 [cs.CV] Apr. 12, 2018, 10 pgs.

Ulyanov, et al., "Instance Normalization: The Missing Ingredient for East Stylization", arXiv:1607.08022v3 [cs.CV] Nov. 6, 2017, 6 pgs.

Wang, et al., "Non-Local Neural Networks", arXiv:1711.07971v3 [cs.CV] Apr. 13, 2018.

Wu, et al., "Group Normalization", arXiv:1803.08494v3 [cs.CV] Jun. 11, 2018, 10 pgs.

Xie, et al., "Rethinking Spatiotemporal Feature Learning: Speed-Accuracy Trade-offs in Video Classification", arXiv:1712.04851v2 [cs.CV] Jul. 27, 2018, 17 pgs.

Kim et al., "Revisiting Batch Normalization for Training Low-Latency Deep Spiking Neural Networks from Scratch," arXiv, Oct. 5, 2020, 14 pages.

International Searching Authority, "International Search Report," issued in connection with PCT Application No. PCT/CN2021/115902, mailed on May 31, 2022, 3 pages.

International Searching Authority, "Written Opinion," issued in connection with PCT Application No. PCT/CN2021/115902, mailed on May 31, 2022, 4 pages.

International Searching Authority, "International Preliminary Report on Patentability," issued in connection with PCT Application No. PCT/CN2021/115902, mailed on Mar. 14, 2024, 6 pages.

* cited by examiner

116

DYNAMIC TEMPORAL NORMALIZATION FOR DEEP LEARNING IN VIDEO UNDERSTANDING APPLICATIONS

CLAIM OF PRIORITY

This Application is a National Stage Entry of, and claims priority to, PCT Application No. PCT/CN2021/115902, filed on Sep. 1, 2021 and titled "DYNAMIC TEMPORAL NORMALIZATION FOR DEEP LEARNING IN VIDEO UNDERSTANDING APPLICATIONS", which is incorporated by reference in its entirety for all purposes.

BACKGROUND

Video action recognition, video object detection, video segmentation, and other video understanding applications are fundamental problems in visual understanding and are challenging tasks in real world applications. Currently, deep learning (DL) based techniques have become the mainstream in action recognition and similar video understanding tasks. In such DL applications such as deep neural networks (DNNs), normalization is an indispensable component. Existing normalization techniques deployed in video understanding are primarily targeted for image recognition tasks. Such techniques have limitations when extended to video models. First, large memory and compute demand for video models restricts the mini-batch size to a much smaller range compared to the settings for image tasks. Such restrictions introduce bias and noise during the estimation of normalization parameters, thereby degrading performance. Second, existing normalization techniques are unable to handle complicated spatial-temporal feature variations of video data, which also limits video recognition and other video understanding application performance. Other current techniques for improving DNNs in video understanding contexts include new building blocks for spatial-temporal modeling such as 3D convolutional building blocks, integrating attentive blocks for video models, and others. However, the issue of normalization has not been addressed.

There is an ongoing need for high quality and efficient DNNs for video understanding applications and, in particular, for improved normalization in such applications. It is with respect to these and other considerations that the present improvements have been needed. Such improvements may become critical as the implementation of video understanding models in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
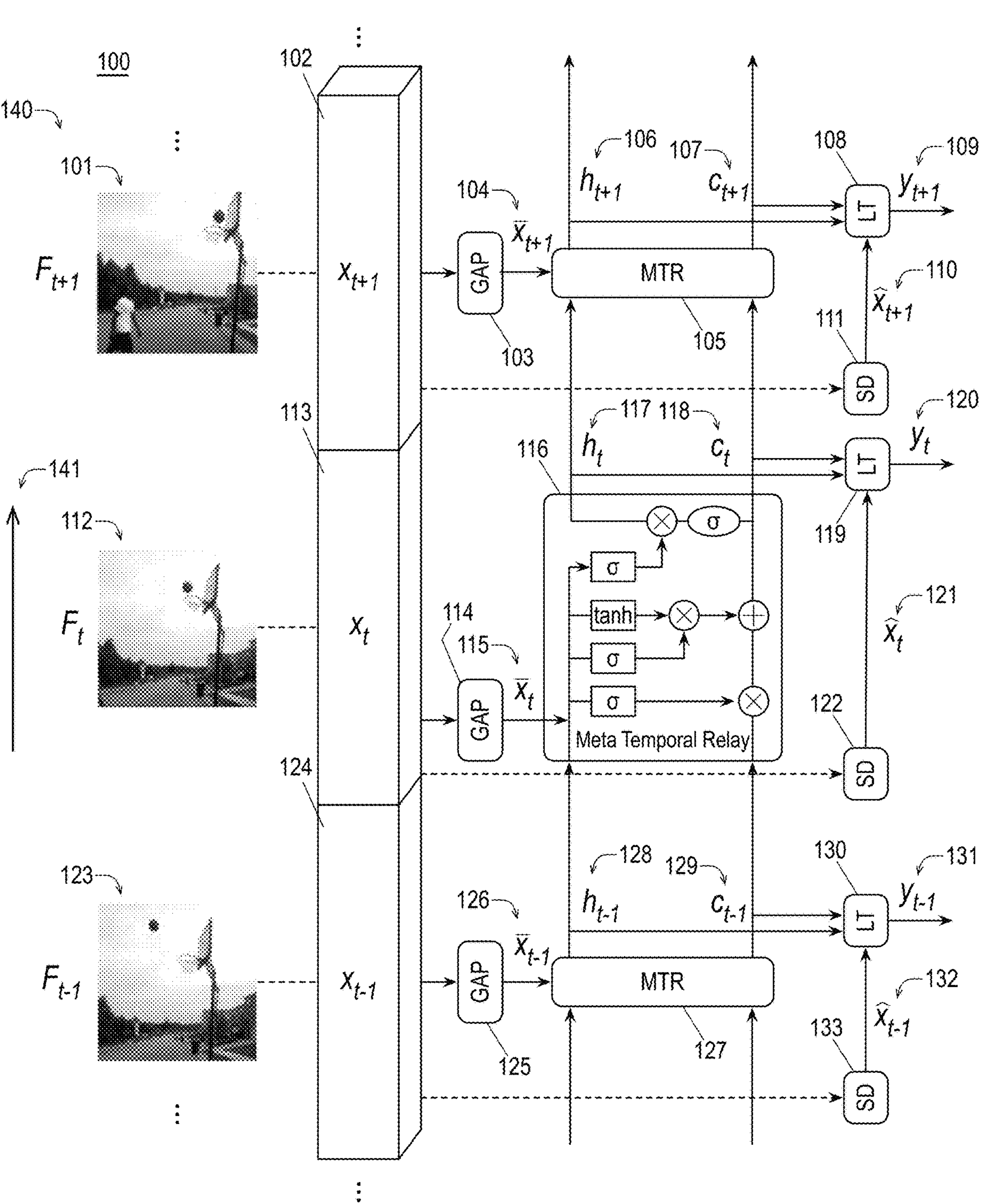
FIG. 1 illustrates an example system to provide dynamic temporal normalization in video recognition.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing normalization platforms, and articles are described herein related to video recognition using deep learning and, in particular, to dynamic temporal normalization of feature maps generated by layers of a deep neural network.

As described above, it is desirable to improve the performance of deep neural networks (DNNs) particularly in the context of feature map normalization. As used herein, the term DNN indicates an artificial neural network with multiple layers between an input layer (or input) and an output layer (or output). DNNs are inclusive of convolutional neural networks (CNNs), recurrent neural networks (RNNs), and networks that include modules or characteristics from any of such networks. The techniques discussed herein provide dynamic temporal normalization in the context of video recognition to improve performance in terms of reduced memory and compute demand, removal of restrictions on mini-batch size in such normalization, ability to handle complicated spatial-temporal feature variations, and others. As used herein, the term video recognition indicates any recognition of any characteristic from input video inclusive of video object detection (e.g., detecting one or more objects), video action detection (e.g., detecting an action), video segmentation (e.g., dividing video frames into identified segments or regions), or others.

The techniques and modules discussed herein may be implemented in any DNN. Thereby, the discussed techniques provide a general drop-in normalization technique. The discussed techniques are characterized as dynamic temporal normalization (DTN), which can be applied to any DNN such as deep CNNs to bring a significant performance boost to video recognition tasks. In some embodiments, dynamic temporal normalization introduces a meta learning mechanism for normalization which learns to predict normalization parameters in a sample-adaptive manner and associates temporal feature distributions across neighboring video frames. With its dynamic and temporal modeling capabilities, dynamic temporal normalization resolves possible inaccurate mini-batch statistics estimation under restricted mini-batch size settings and significantly improves video feature learning with negligible extra computational costs. Such improvements are evident both in training (e.g., accelerating training speed and convergence with improved accuracy and stability) and inference phases of the DNN (e.g., lower memory and compute resources with improved accuracy and stability).

The dynamic temporal normalization techniques discussed herein are dynamic, conditional, sample-aware, and distribution adaptive along the temporal axis of the input video such that features of the DNN feature maps are dynamically normalized conditional on the input video. Such techniques are advantageous in the context of video recognition for improved temporal correlation and accuracy of the DNN.

In some embodiments, a current feature map from a layer of the DNN (e.g., any layer inclusive of an input layer) is standardized using a mean and a standard deviation estimated using different subsets of input pixels depending on the normalization technique being deployed (e.g., batch normalization, instance normalization, layer normalization, group normalization). The current feature map and the resultant current standardized feature map correspond to a particular time stamp of the input video. Furthermore, current transform parameters for linear transformation of the current standardized feature map are generated based on prior transform parameters and one of a current feature vector or a current feature map corresponding to the current time stamp. Notably, the prior transform parameters correspond to a prior time stamp of the input video and were used to transform a prior standardized feature map to a prior normalized feature map for the prior time stamp. In some embodiments, the current transform parameters include a hidden state parameter and a cell state parameter of a meta temporal relay applied to the prior transform parameters and the current feature vector or the current feature map. The current standardized feature map is then transformed to a current normalized feature map using the current transform parameters. In some embodiments, the current transform parameters (i.e., the hidden state parameter and the cell state parameter of the meta temporal relay) are used in place of the mean and standard deviation for the normalization operation. Using such hidden state and cell state parameters provide for dynamic and adaptive normalization along the temporal axis for improved network performance. Subsequent to such standardization and normalization, the resultant current normalized feature map is used by a subsequent layer of the DNN. Ultimately, a video recognition output is generated based on application of the subsequent layer of the deep neural network. Any number of normalization layers of the DNN may utilize such dynamic temporal normalization techniques.

FIG. 1 illustrates an example system 100 to provide dynamic temporal normalization in video recognition, arranged in accordance with at least some implementations of the present disclosure. System 100 may be implemented via any suitable device such as a personal computer, a laptop computer, a server computer, an edge device, a cloud device, a tablet, a phablet, a smart phone, a digital camera, a gaming console, a wearable device, a display device, an all-in-one device, a two-in-one device, or the like. For example, system 100 may provide at least a portion of an image artificial intelligence processing pipeline that may be implemented in hardware, software, or a combination thereof. In some embodiments, system 100 is implemented, in an implementation phase, in hardware as a system-on-a-chip (SoC). In some embodiments, the SoC is employed as a monolithic integrated circuit (IC). As used herein, the term monolithic indicates a device that is discrete from other devices, although it may be coupled to other devices for communication and power supply.

As shown in FIG. 1, system 100 receives input video 140 inclusive of video frames 123, 112, 101 such that video frame 123 is prior to video frame 112, which is prior to video frame 101, and so on such that a temporal axis 141 of input video 140 is established. As used herein, the term temporal axis indicates input video 140 is captured, presented, and so on with frames sequenced over time. In the context of system 100, input video 140 displays a basketball scene but input video 140 may display any suitable scene. Each of video frames 123, 112, 101 is associated with a time stamp such that the time stamp of video frame 123 is prior to the time stamp of video frame 112, which is prior to the time stamp of video frame 101, and so on. Such time stamps may be provided as explicit data structures or they may be implicit to the ordering, frame rate and/or other characteristics of input video 140.

For each of video frames 123, 112, 101, a corresponding feature map 124, 113, 102 is generated by a layer of a DNN deployed by system 100. Feature maps 124, 113, 102 (e.g., $x_{t+1}$, $x_t$, $x_{t-1}$, and so on) may be generated at an input layer of the DNN (e.g., they may include the color channels of video frames 123, 112, 101 or other features extracted from video frames 123, 112, 101) or they may be generated by a subsequent layer of the DNN (e.g., such that the features become more abstract data representations). In any event, such feature maps 124, 113, 102 each correspond to one of video frames 123, 112, 101. In some embodiments, all of feature maps 124, 113, 102 are a feature tensor extracted at a particular layer of the DNN, which are split or segmented into feature maps 124, 113, 102. In such regards, feature maps 124, 113, 102 may also be characterized as sub-feature maps, although the term feature map is used more frequently herein. In either case, the term feature map or maps indicates any number of features and types of features extracted by the DNN layer. Such details are discussed further herein below.

As shown, for each time stamp or instance and for each of feature maps 124, 113, 102, a global average pooling module 125, 114, 103 (GAP), a meta temporal relay 127, 116, 105 (MTR), a standardization module 133, 122, 111 (SD), and a linear transform module 130, 119, 108 (LT) is provided. Processing by such modules or components provides a normalized feature map 131, 120, 109 (e.g., $x_{t-1}$, $x_t$, $x_{t+}1$, and so on) for each of feature maps 124, 113, 102 (and video frames 123, 112, 101). Such normalized feature maps 131, 120, 109 may then be combined and provided to another layer of the DNN for continued processing through a resultant video recognition output as discussed further herein below.

Notably, the processing for each combination of feature maps, GAP modules, MTRs, and so on may be performed in the same or similar manner with exemplary processing being discussed with respect to feature map 113, global average pooling module 114, meta temporal relay 116, standardization module 122, and linear transform module 119. That is, feature maps 102, 124 may be processed by global average pooling modules 103, 125, meta temporal relays 105, 127, standardization modules 111, 133, and linear transform modules 108, 130, respectively, as discussed with respect to processing of feature map 113 by global average pooling module 114, meta temporal relay 116, standardization module 122, and linear transform module 119. Notably, a standardized feature map 110 is transformed by linear transform module 108 to a normalized feature map 109 using a hidden state parameter 106 and a cell state parameter 107 of meta temporal relay 105. Similarly, a standardized feature map 132 is transformed by linear transform module 130 to a normalized feature map 131 using a hidden state parameter 128 and a cell state parameter 129 of meta temporal relay 127. Furthermore, internal details of meta temporal relays 127, 116, 105 are illustrated with respect to meta temporal relay 116 and discussed further herein with respect to FIG. 2.

For example, as shown, global average pooling module 114 receives feature map 113 and generates a feature vector 115 (e.g., $\bar{x}_t$) using any suitable technique or techniques. Such global average pooling techniques aggregate feature maps 113 to, for example, a single dimension (e.g., to reduce dimensionality). Such processing may be performed using any suitable technique or techniques such as reducing each h×w feature map to a single number by taking an average of all hw values. However, other techniques may be deployed. Also as shown, standardization module 122 receives feature map 113 and generates a standardized feature map 121 (e.g., $\hat{x}_t$) using any suitable technique or techniques. In some embodiments, standardization module 122 generates standardized feature map 121 using a mean and standard deviation estimated using different subsets of pixel values of video frame 112 and/or feature map 113 as discussed further herein below with respect to Equation (1). Notably, normalization as performed by linear transform module 119 is not performed using such mean and standard deviation parameters. Instead, a hidden state parameter 117 and a cell state parameter 118 as generated by meta temporal relay 116 are deployed as discussed with respect to Equation (3).

As shown, meta temporal relay 116 receives hidden state parameter 128 and cell state parameter 129 (e.g., prior time stamp transform parameters), and feature vector 115 for processing. Notably, hidden state parameter 117 and cell state parameter 118 were used to transform standardized feature map 121 to normalized feature map 131 by linear transform module 130. Meta temporal relay 116 dynamically generates relay normalization parameters between video frames 123, 112. For example, system 100 provides for dynamic normalization along temporal axis 141 for improved training an inference by a DNN deploying system 100. In some embodiments, meta temporal relay 116 generates hidden state parameter 117 and cell state parameter 118 via application of a gating mechanism or structure. The gating mechanism or structure may be any linear or non-linear mapping function. In some embodiments, the gating mechanism or structure is a bottleneck unit such as a contraction-expansion bottleneck unit with a typical reduction of ratio 4.

Linear transform module 130 receives hidden state parameter 117 and cell state parameter 118 and applies them to standardized feature map 121 to generate normalized feature map 120, which is combined with normalized feature maps 109, 131 for use by a subsequent DNN layer. In some embodiments, normalized feature map 120 is generated from standardized feature map 121 by summing cell state parameter 118 with a product of each standardized feature of standardized feature map 121 and hidden state parameter 117, as discussed further herein below with respect to Equation (3).

System 100 provides dynamic temporal normalization module for video recognition applications. The dynamic temporal normalization module includes meta temporal relays 127, 116, 105. Each meta temporal relay is a light-weight meta structure that is shared among temporal feature slices along temporal axis 141 of input video 140, which provides dynamic normalization parameters (i.e., hidden state parameters and cell state parameters) generation and relay along the temporal dimension of temporal axis 141. Notably, feature tensors (e.g., inclusive of feature maps 124, 113, 102, and so on) fed into the dynamic temporal normalization module are split (e.g., into individual ones of feature maps 124, 113, 102) and individually undergo a standardization (SD) and a linear transformation (LT), such that standardization may be performed using conventional techniques while linear transformation is performed using dynamically generated parameters from meta temporal relays 127, 116, 105. Notably, the dynamically generated parameters (e.g., hidden state parameters 128, 117, 106 and cell state parameter 129, 118, 107) provide a sample-aware mechanism to dynamically relay and generate normalization parameters along the temporal dimension of temporal axis 141 to overcome possible inaccurate mini-batch statistics estimation under restricted mini-batch size settings. Furthermore, dynamic temporal normalization provides an efficient, stable, and high quality mechanism to model complicated spatial-temporal feature distribution dependencies via shared lightweight meta temporal relay structures as provided by meta temporal relays 127, 116, 105. In some embodiments, the dynamic temporal normalization provided by system 100 first conducts standardization (SD) individually for each sub-feature-map (e.g., each of feature maps 124, 113, 102) corresponding to different input video frames 123, 112, 101, using means and variances determined from each sub-feature-map itself. Then the dynamic temporal normalization conducts linear transformation (LT) using parameters dynamically generated from a meta temporal relay structure. The normalized sub-feature-maps (e.g., normalized feature maps 131, 120, 109) are stacked to form a final normalized feature map, which is used by a subsequent DNN layer. Such techniques may be applied in any normalization context inclusive of batch normalization (BN), instance normalization (IN), layer normalization (LN), group normalization (GN), or the like.

For example, given input video 140 (e.g., an input video clip), a feature tensor extracted at a particular layer of a DNN (or an input feature tensor at an input layer of the DNN) may be defined as $X \in \mathbb{R}^{N \times T \times C \times H \times W}$ where N is the batch size, T is the temporal length, C is the number of channels, and H and W are the height and width. Typical normalization techniques (e.g., BN, IN, LN, GN, etc.) from a general perspective, typically include two steps. The first is standardization (SD) performed as shown in Equation (1)

$$\hat{x}_i = \frac{x_i - \mu}{\sqrt{\sigma^2 + \epsilon}} \tag{1}$$

where i is the feature index, $\epsilon$ is a small constant to preserve numerical stability, and $\mu$ and $\sigma$ are mean and standard deviation estimated using different subsets of input pixels depending on normalization techniques.

The second typical step is a channel-wise linear transformation to recover the d feature representation ability as shown in Equation (2)

$$y_i = \gamma \hat{x}_i + \beta \tag{2}$$

where $\gamma$ and $\beta$ are learnable scale and shift parameters.

With continued reference to FIG. 1, in dynamic temporal normalization discussed herein, the feature tensor (e.g., the input video feature tensor as generated at any layer of the DNN) is split into a sequence of sub-feature-maps or, simply, feature maps such as feature maps 124, 113, 102, which may be characterized as $\{x_1, x_2, \ldots, x_T\}$, along the temporal dimension of temporal axis 141. In such contexts, $x_t$ may denote a feature map or feature slice corresponding to the $t^{th}$ input frame of input video 140. As shown, standardization is applied to each of feature maps 124, 113, 102 via standardization modules 133, 122, 111. In some embodiments, such standardization is applied is applied as discussed with respect to Equation (1) to generate standardized feature maps 132, 121, 110, which may be characterized as $\hat{x}_t$, for t=1, . . . , T.

Furthermore, the global average pooling is applied to feature maps 124, 113, 102 via global average pooling modules 125, 114, 103 to generate feature vectors 126, 115, 104 (or feature slices), which may be characterized as $\bar{x}_t$. For example, $\bar{x}_t$ may be the feature vectors after application of global average pooling to $x_t$. In place of scale and shift parameters, dynamic temporal normalization performs linear transformation, via linear transform modules 120, 119, 108, generated by meta temporal relays 127, 116, 105. For example, normalized feature maps may be generated as shown in Equation (3)

$$y_t = \gamma_t \hat{x}_t + \beta_t = h_t \hat{x}_t + c_t \tag{3}$$

where $h_t$ and $c_t$ are the hidden state and cell state (e.g., hidden state parameters 128, 117, 106 and cell state parameters 129, 118, 107) of meta temporal relays 127, 116, 105 for the $t^{th}$ input feature slice (e.g., time stamp of input video 140).

In some embodiments, hidden state parameters 128, 117, 106 and cell state parameters 129, 118, 107 are generated by meta temporal relays 127, 116, 105 (e.g., a meta temporal relay structure) as shown in Equation (4)

$$(h_t, c_t) = MTR(\bar{x}_t, h_{t-1}, c_{t-1}) \tag{4}$$

where $h_t$ and $c_t$ are the current hidden state and cell state (e.g., hidden state parameter 117 and cell state parameter 118), MTR is the application of meta temporal relay 116, $\bar{x}_t$ is the current feature vector) and $h_{t-1}$ and $c_{t-1}$ are the prior hidden state and cell state.

The current hidden state and cell state (e.g., hidden state parameter 117 and cell state parameter 118) are then used by the linear transform module (e.g., linear transform module 119 to generate) to generate a normalized feature map (e.g., normalized feature map 120) as shown in Equation (3). For example, transforming a standardized feature map (e.g., standardized feature map 121) to a normalized feature map (e.g., normalized feature map 120) may include summing the cell state (e.g., cell state parameter 118) with a product of each standardized feature of the standardized feature map and the hidden state (e.g., hidden state parameter 117). The normalized sub-feature maps (or feature maps) $\{y_1, y_2, \ldots, y_T\}$ are stacked to form a final normalized feature map or tensor. In this way, the normalized video feature considers the feature distribution dependencies between neighboring frames via a lightweight shared MTR.

In some embodiments, the meta temporal relay includes a meta structure to dynamically generate and relay normalization parameters between neighboring frames. In some embodiments, as shown, the gating mechanism in the meta temporal relay can be denoted as shown in Equation (5)

$$(f_t, i_t, g_t, o_t) = \phi([\bar{x}_t, h_{t-1}]) + b \tag{5}$$

where $\phi(\bullet)$ is a bottleneck unit for processing the input feature $\bar{x}_t$ and the prior hidden state $h_{t-1}$, b is a bias, and $f_t$, $i_t$, $g_t$, $o_t$ form a set of gates to regularize the update of the meta temporal relay. For example, $f_t$ may be a forget gate to determine how much information to forget, $i_t$ may be an input gate to determine how much information to keep from the current time instance, $g_t$ may be a gate to determine how to combine the information, and $o_t$ may be an output gate to determine how to combine the information to form a final output. For example, such gates may be deployed as used in long short-term memory modules as used in recurrent neural network architectures.

In some embodiments, $f_t$, $i_t$, $g_t$, $o_t$ may regularize the update of the meta temporal relay as shown in Equation (6) and Equation (7):

$$c_t = \sigma(f_t) \odot c_{t-1} + \sigma(i_t) \odot \tanh(g_t) \quad (6)$$

$$h_t = \sigma(o_t) \odot \sigma(c_t) \quad (7)$$

where $c_t$ is the cell state, $h_t$ is the hidden state, $\sigma(\bullet)$ is the simoid function, and $\odot$ is the Hadamard product operator.

Via integration of the meta temporal relay with meta normalization learning, the cell state $c_t$ and the hidden state $h_t$ of the meta temporal relay structure are set as the scale parameter $\gamma_t$ and the shift parameter $\beta_t$ for the $t^{th}$ video feature slice as shown in Equation (8):

$$\gamma_t = h_t, \beta_t = c_t \quad (8)$$

where the cell state $c_t$ and the hidden state $h_t$ are deployed in place of the scale parameter $\gamma_t$ and the shift parameter $\beta_t$ for improved performance. As shown in Equation (4) and elsewhere herein, this setting makes the normalization parameters for the $t^{th}$ video feature slice be conditioned on not only the current input feature $x_t$ but also the estimated normalization parameters $c_{t-1}$ and $h_{t-1}$ or the previous video feature slice $x_{t-1}$.

It is noted that the extra parameters and computational costs of the dynamic temporal normalization discussed herein are mainly from the meta temporal relay structure, which is negligible compared to baseline models of the DNN. The techniques discussed herein provide a variety of advantages when employed in a variety of DNN backbones inclusive of improved recognition accuracy, reduced training time, and improved network stability.

Figure 2:
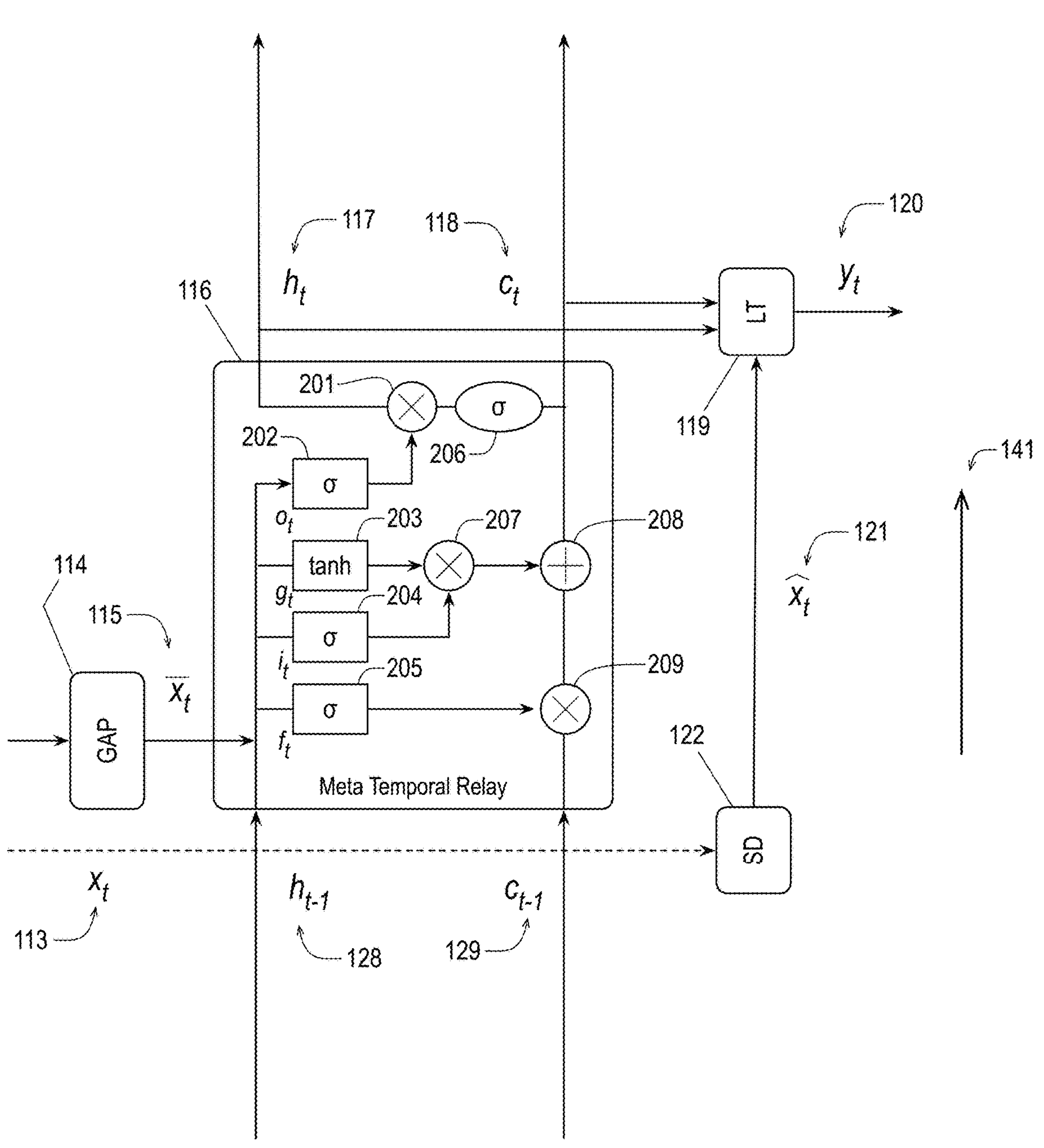
FIG. 2 illustrates an example meta temporal relay to provide dynamic transform parameters for transformation of a standardized feature map to a normalized feature map.

FIG. 2 illustrates an example meta temporal relay 116 to provide dynamic transform parameters for transformation of a standardized feature map to a normalized feature map, arranged in accordance with at least some implementations of the present disclosure. As discussed with respect to FIG. 1, meta temporal relay 116 receives feature vector 115, hidden state parameter 128, and cell state parameter 129. Meta temporal relay 116 is to generate hidden state parameter 117 and cell state parameter 118 for a feature map, a corresponding video frame, and so on for a current time stamp of input video. Hidden state parameter 128 and cell state parameter 129 are generated by a meta temporal relay for a prior time stamp and are used to transform a prior standardized feature map to a prior normalized feature map for a prior time stamp of the input video.

The details discussed with respect to meta temporal relay 116 may be applied via any meta temporal relay herein such as meta temporal relays 105, 127. As shown, meta temporal relay 116 includes sigmoid function modules 202, 204, 205, 206, a hyperbolic tangent module 203, Hadamard product operators 201, 207, 209, and an adder 208. For example, sigmoid function modules 202, 204, 206, a hyperbolic tangent module 203, Hadamard product operators 201, 207, 209, and an adder 208 may implement the operations of Equations (6) and (7) discussed above.

For example, sigmoid function module 202 may apply a sigmoid function based on an output gate, $o_t$, deployed to determine how to combine the information of meta temporal relay 116 and sigmoid function module 206 may apply a sigmoid function based on the cell state parameter $c_t$, and the results may then undergo a Hadamard product as provided by Hadamard product operator 201 to ultimately generate hidden parameter $h_t$ as shown with respect to Equation (7). Furthermore, sigmoid function module 205 may apply a sigmoid function based on a forget gate, $f_t$, to determine how much information to forget and the result and the prior cell state parameter $c_{t-1}$ may then undergo a Hadamard product as provided by Hadamard product operator 209. The result is then summed, via adder 208 with a Hadamard product, as provided by Hadamard product operator 207, of a sigmoid function applied to an input gate, $i_t$, to determine how much information to keep (e.g., the sigmoid function applied via sigmoid function module 204) and a hyperbolic tangent function applied based on a gate, $g_t$, deployed to determine how to combine the information of meta temporal relay 116 (e.g., the hyperbolic tangent function applied via hyperbolic tangent module 203). The summation is then ultimately used as the cell state parameter $c_t$ as shown with respect to Equation (7). The solution, approximation, or estimation of such parameters of meta temporal relay 116 may be determined using any suitable technique or techniques such as linear or non-linear mappings.

As discussed with respect to FIG. 1 and elsewhere herein, the resultant hidden state parameter 117 and cell state parameter 118 are used to normalize or linear transform standardized feature map 121 to normalized feature map 120. Thereby, dynamic temporal normalization is provided, which provides dynamic normalization parameters (i.e., hidden state parameters and cell state parameters) generation and relay along the temporal dimension of temporal axis 141.

Figure 3:
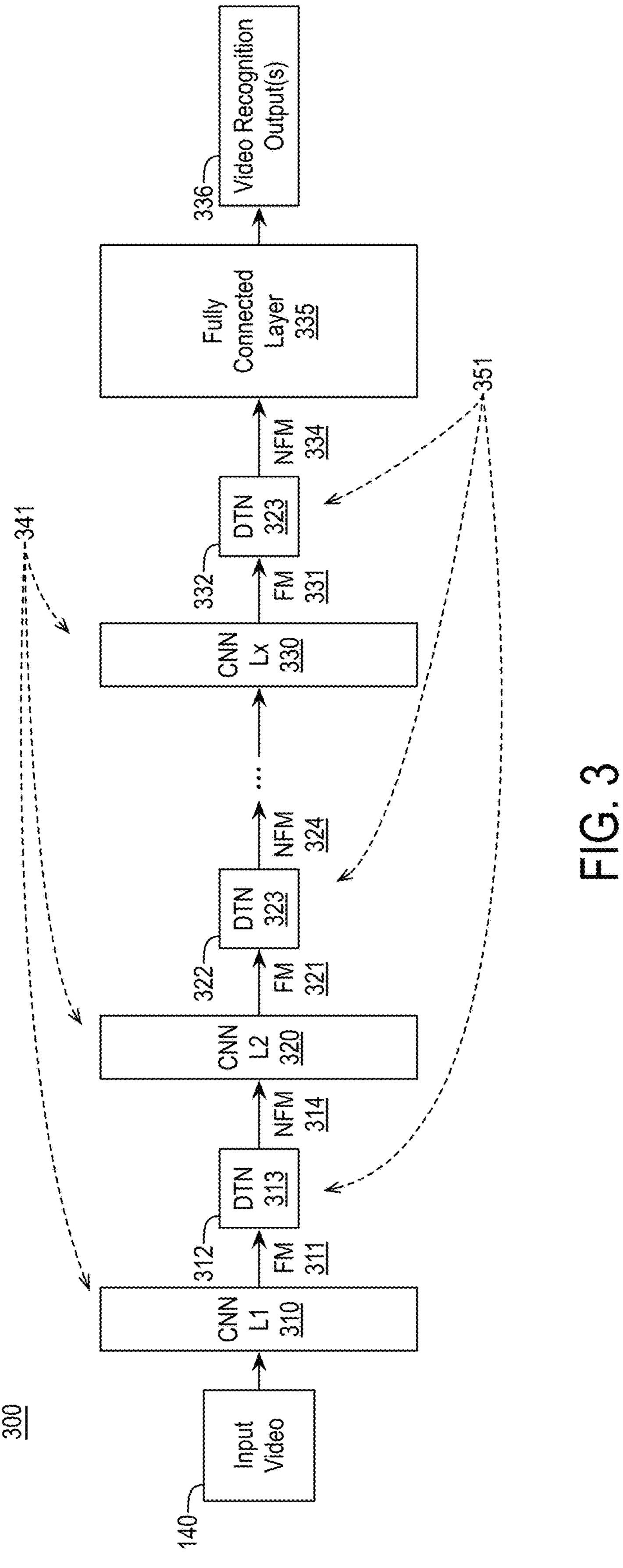
FIG. 3 illustrates an example deep neural network including one or more dynamic temporal normalization modules to perform video recognition on input video.

FIG. 3 illustrates an example deep neural network 300 including one or more dynamic temporal normalization modules to perform video recognition on input video 140, arranged in accordance with at least some implementations of the present disclosure. As with system 100, deep neural network 300 may be implemented via any suitable device such as a personal computer, a laptop computer, a server computer, an edge device, a cloud device, a tablet, a phablet, a smart phone, a digital camera, a gaming console, a wearable device, a display device, an all-in-one device, a two-in-one device, SoC, or the like. Deep neural network 300 may be trained in a training phase (not shown) and implemented in an inference phase to provide video recognition output(s) 336. Deep neural network 300 may perform any video recognition task or tasks including video object detection, video action detection, or video segmentation. Video recognition output 336 may include any suitable data structure indicative of such recognition inclusive of video clip level indicators (e.g., indicating a detected object in the clip, a detected activity in the clip, etc.), video frame level indicators (e.g., indicating a detected object in the frame, a detected activity in the frame, etc.), or pixel or block level indicators (e.g., indicating a detected object in the pixel or block, a detected activity in the pixel or block, a segmentation identifier of the pixel or block, etc.). Other data structures such as probabilities in place of indicators may be used.

As shown, deep neural network 300 includes a first convolutional neural network layer (CNN L1) 310, a dynamic temporal normalization (DTN) module 313, a second CNN layer (CNN L2) 320, a DTN module 323, any number of intervening CNN layers and DTN modules, a final CNN layer (CNN Lx) 330, and an optional fully connected layer 335. Such layers are trained, in a network training phase to provide finalized parameters for deployment in a network inference phase. As shown, in some embodiments, between each pair of CNN layers 341, a DTN module of DTN modules 351 is provided. In other embodiments, some adjacent CNN layer pairs are absent a DTN module such that standard normalization may be performed. That is, DTN modules 351 may be implemented at some but not all CNN layers. Furthermore, each of DTN modules 351 may include a global average pooling module 114, a meta temporal relay, a standardization module, and a linear transform module to perform the functions as discussed herein.

DNN 300 receives input video 140 for processing. Input video 140 may include any suitable video resolution and format such as YUV format video at HD, UHD, 4K, or any other resolution. three-channel input including one channel for each color channel (e.g., RGB, YUV, etc.). Input video 140 provides an input volume that may be supplemented by other characteristics of input video 140 such as binary mask layers, motion vector layers, and so on depending on the visual recognition task being employed by DNN 300. CNN layer 310 processes input video 140 (i.e., an input volume or tensor) to provide a feature tensor or feature maps 311. Feature maps 311 may then be segmented into sub-feature maps (or, simply, feature maps) that are processed as discussed herein with respect to FIG. 1 by DTN module 313 to generate normalized feature maps 314. Feature maps 314 may also be characterized as a feature tensor or feature volume or the like.

Feature maps 314 are then provided to subsequent CNN layer 320, which processes feature maps 314 (i.e., an input volume or tensor) to provide an output feature tensor or feature maps 321. Feature maps 321 may then be segmented and processed by DTN module 323 as discussed herein to generate normalized feature maps 314. Feature maps 324, and so on through final CNN layer 330. The output of CNN layer 330, feature tensor or feature maps 331, may be normalized by DTN module 323 to generate normalized feature maps 334, which are provided to fully connected layer 335. Alternatively, feature maps 331 may be provided to fully connected layer 335. Fully connected layer 335 generates video recognition output 336. Although illustrated with respect to DNN 300, DTN modules 351 may be deployed in any suitable video recognition deep learning architecture.

Figure 4:
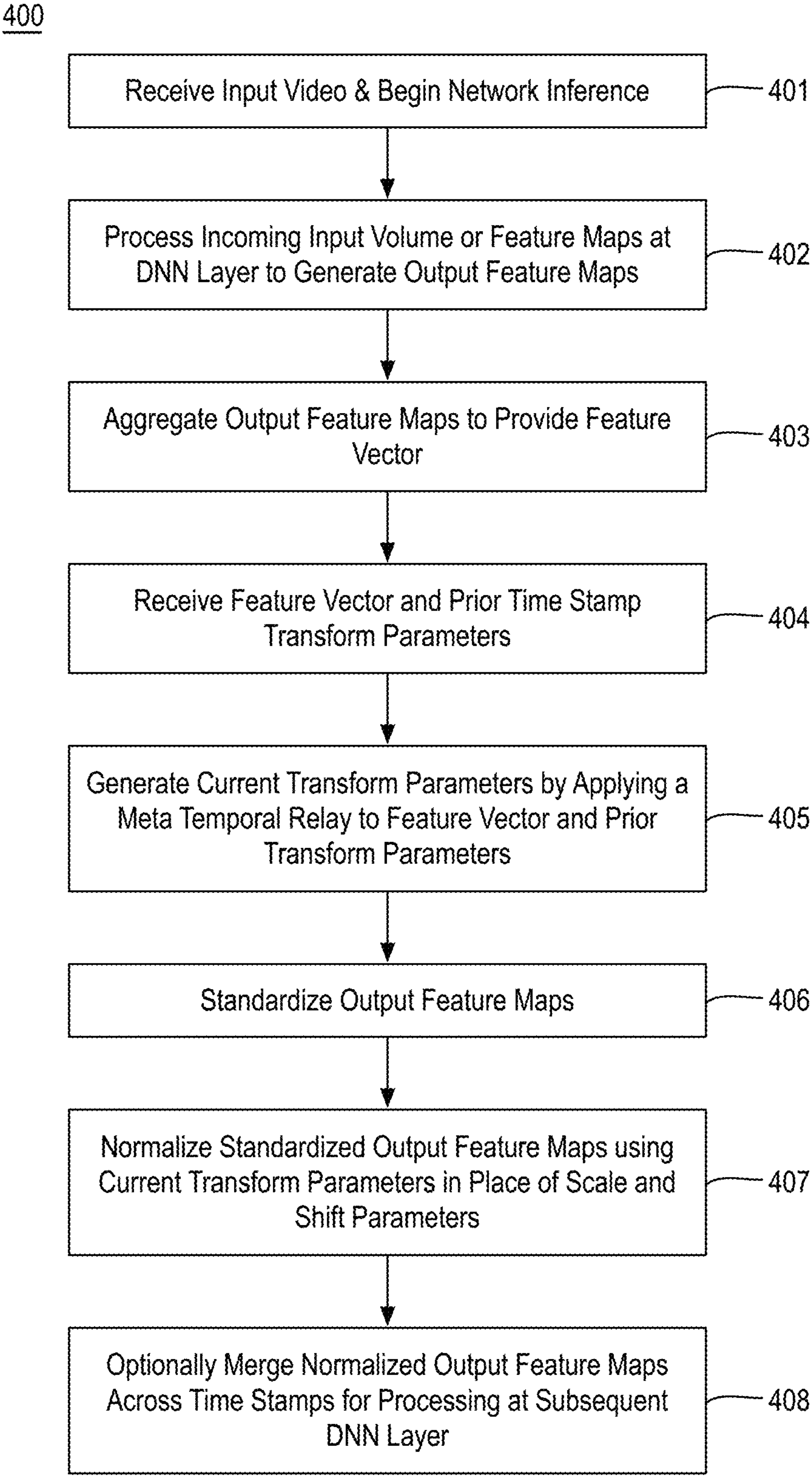
FIG. 4 is a flow diagram illustrating an example process for performing inference using a deep neural network including one or more dynamic temporal normalization modules.

FIG. 4 is a flow diagram illustrating an example process 400 for performing inference using a deep neural network including one or more dynamic temporal normalization modules, arranged in accordance with at least some implementations of the present disclosure. Process 400 may include one or more operations 401-408 as illustrated in FIG. 4. Process 400 or portions thereof may be performed by any device or system discussed herein to provide video recognition.

Process 400 begins at operation 401, where an input video clip is received for video recognition processing. Furthermore, a pre-trained DNN may be received or deployed for processing the input video clip. The pre-trained DNN is trained in a training phase and then deployed in an inference phase where the preselected DNN architecture and pre-trained DNN parameters are implemented via a device or system either locally (e.g., at a local device) or remotely (e.g., at a cloud or server service) to perform inference on the input video clip to generate video recognition output.

Processing continues at operation 402, where an incoming input volume or output feature maps from within the DNN are processed at a particular DNN layer to generate output feature maps. Such processing may be performed using any suitable technique or techniques. For example, the DNN layer may implement a CNN layer deploying any number of convolutional kernels to the incoming feature tensor to generate the output feature tensor. Other operations or modules may be applied such as rectified linear unit operations. Notably, the output feature tensor may be divided into any number of temporally adjacent feature maps, each having or corresponding to a time stamp of the input video clip.

Processing continues at operation 403, where the output feature maps are aggregated using any suitable technique or techniques (e.g., to reduce dimensionality). In some embodiments, global average pooling is applied to each output feature map to aggregate the feature map. In some embodiments, the resultant feature vector has a dimensionality of one. However, other dimensionalities may be used.

Processing continues at operation 404, where the resultant feature vector for each feature map is received along with prior time stamp transform parameters. Notably, the prior time stamp transform parameters are used to transform a prior time stamp standardized feature map to a prior time stamp normalized feature map. By basing current time stamp transform parameters (e.g., to transform a current time stamp standardized feature map to a current time stamp normalized feature map) on prior time stamp transform parameters in an ongoing temporal manner, improved performance of the DNN is achieved, for example, in handling complicated spatial-temporal feature variations of the video data.

Processing continues at operation 405, where current time stamp transform parameters are generated by applying a meta temporal relay to the feature vector generated at operation 403 and the prior time stamp transform parameters received at operation 404. The current time stamp transform parameters may be generated using any techniques discussed herein. As discussed, in some embodiments, a meta temporal relay is applied to the feature vector and the prior time stamp transform parameters to generate the current time stamp transform parameters. In some embodiments, the meta temporal relay includes a mapping from the current feature vector and a prior hidden state to one or more gating mechanisms applied by the meta temporal relay, as discussed herein. In some embodiments, the mapping includes a bottleneck mapping structure from the current feature vector and the prior hidden state to the one or more gating mechanisms.

Processing continues at operation 406, where the output feature maps generated at operation 402 are standardized to standardized feature maps. The standardization may be performed using any suitable technique or techniques. In some embodiments, the current standardized feature map(s) are generated by standardizing the feature map(s) based on a mean and a standard deviation estimated using at least a portion of the input video or the current feature map(s). As discussed herein, in place of the estimated mean and standard deviation, eventual normalization (via linear transform) is performed using the current time stamp transform parameters generated at operation 405 (e.g., a hidden state parameter and a cell state parameter of the meta temporal relay). Notably, the estimated mean and standard deviation are generated using only current time stamp data (e.g., without use of temporally adjacent data) while the hidden state parameter and cell state parameter are generated using temporally prior data (e.g., the prior time stamp hidden state parameter and cell state parameter) and current data (e.g., the current time stamp feature vector). Although discussed with respect to the current time stamp feature vector being used, in some embodiments, the current feature map or other corresponding current data structure from the pertinent DNN layer may be deployed. Furthermore, operations 403-405 and operation 406 may be performed in either order or in parallel as their operations provide independent processing paths.

Processing continues at operation 407, where the standardized feature maps generated at operation 406 are normalized or linearly transformed to normalized feature maps using the current transform parameters generated at operation 405 in place of the scale and shift parameters used to standardize the feature maps. Such operations may be performed in accordance with Equation (3), for example, such that each feature of the normalized feature maps include a sum of the current cell state parameter and a product of each corresponding standardized feature and the current hidden state parameter. Such techniques provide temporal dependence for improved performance. Such operations (e.g., operations 404-407) may be performed for any number of time instances or time slices in a temporal order of the video clip received at operation 401.

Processing continues at operation 408, where the normalized feature maps across the time instances or time slices in a temporal order may be merged or combined into a feature tensor of all the feature maps for processing at a subsequent DNN layer (e.g., subsequent in a layer order of the DNN). Processing then may continue at operations 402-408 for each layer or at least some remaining layers of the DNN. The final DNN layer may then feed into a fully connected layer for generation of a video recognition output as discussed herein.

Figure 5:
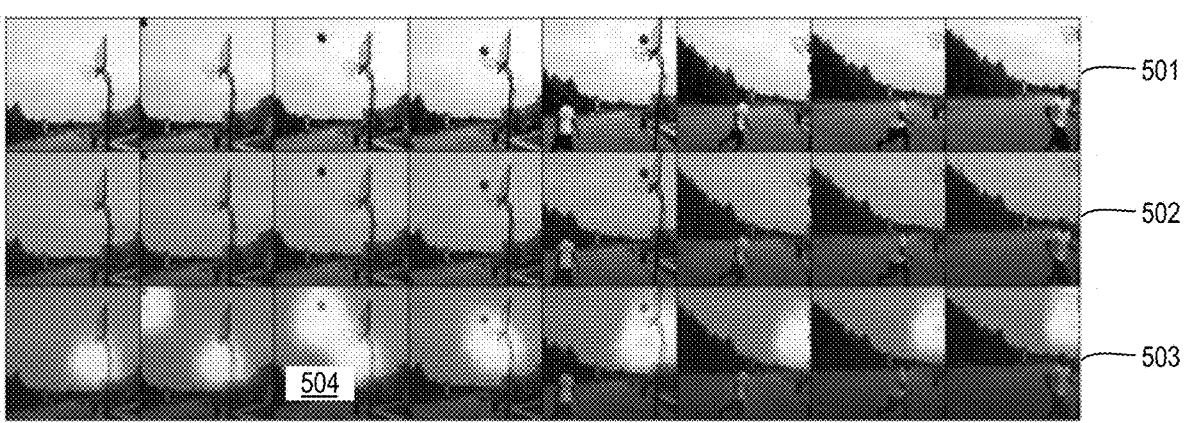
FIG. 5 illustrates an exemplary visual comparison of activation maps for video recognition using dynamic temporal normalization.

FIG. 5 illustrates an exemplary visual comparison of activation maps for video recognition using dynamic temporal normalization, arranged in accordance with at least some implementations of the present disclosure. In FIG. 5, the top row of images presents an exemplary video clip 501 of a basketball scene. The middle row of images illustrates a baseline video recognition 502 without use of dynamic temporal normalization in the DNN architecture. The bottom row of images illustrates dynamic temporal normalization enhanced video recognition 502 using a DNN architecture inclusive of dynamic temporal normalization as discussed herein.

As shown with respect to highlighted features 504 shown in the third image from the right of the bottom row or images, a DNN architecture inclusive of dynamic temporal normalization provides improved accuracy and robustness in feature recognition and detection. Notably, a dynamic temporal normalization enhanced DNN architecture learns video features consistently and accurately localizing motion attentional regions in a variety of contexts.

Figure 6:
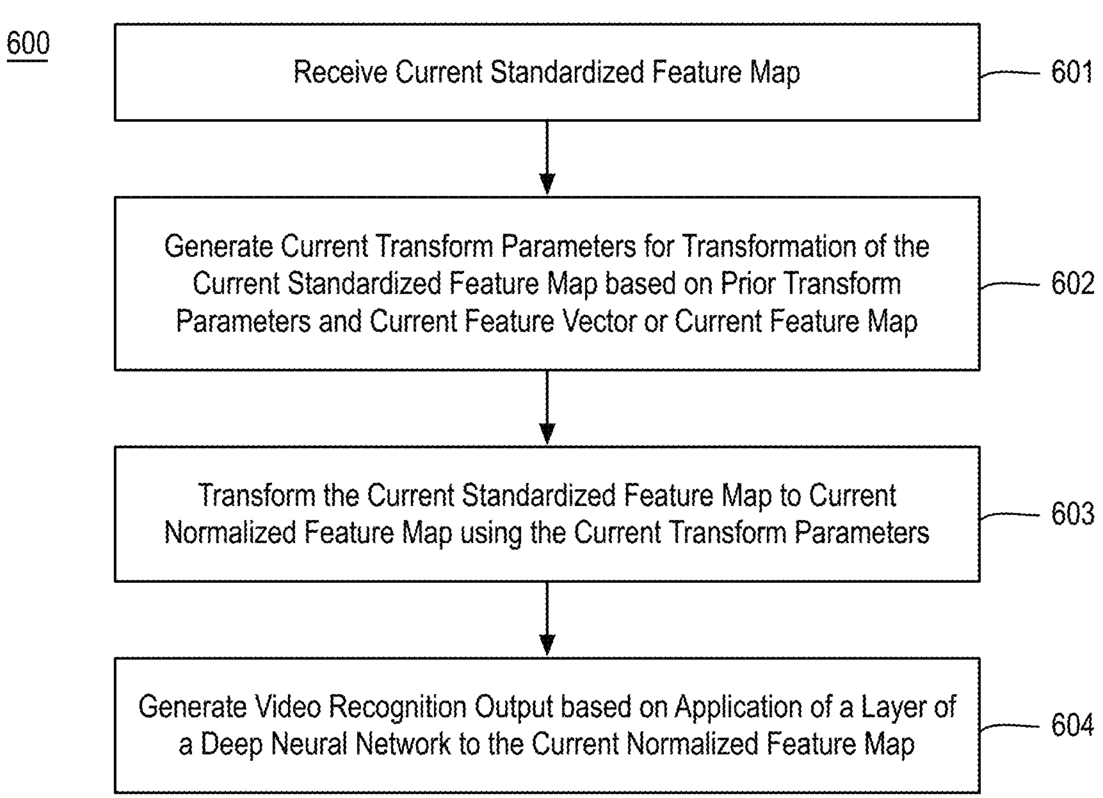
FIG. 6 is a flow diagram illustrating an example process for applying video recognition inclusive of dynamic temporal normalization to input video.

FIG. 6 is a flow diagram illustrating an example process 600 for applying video recognition inclusive of dynamic temporal normalization to input video, arranged in accordance with at least some implementations of the present disclosure. Process 600 may include one or more operations 601-604 as illustrated in FIG. 6. Process 600 may form at least part of an artificial intelligence, video recognition, or other application. By way of non-limiting example, process 600 may form at least part of video processing performed by DNN 300 in an implementation phase thereof (i.e., after a training phase). Furthermore, process 600 will be described herein with reference to system 700 of FIG. 7.

Figure 7:
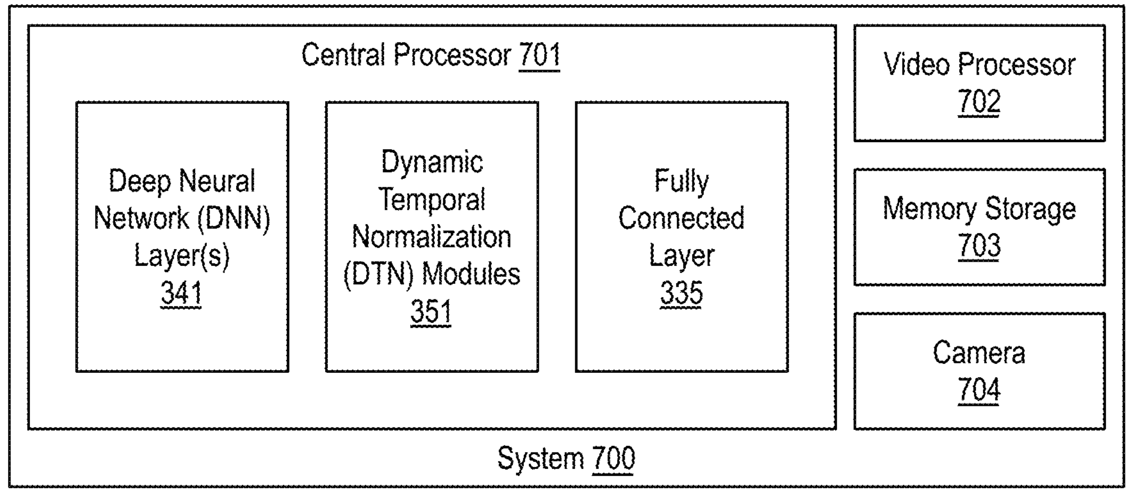
FIG. 7 is an illustrative diagram of an example system for applying video recognition inclusive of dynamic temporal normalization to input video

FIG. 7 is an illustrative diagram of an example system 700 for applying video recognition inclusive of dynamic temporal normalization to input video, arranged in accordance with at least some implementations of the present disclosure. As shown in FIG. 7, system 700 may include a central processor 701, an video processor 702, a memory storage 703, and a camera 704. For example, camera 704 may acquire input video for processing. Also as shown, central processor 701 may include or implement any number of DNN layers 341, DTN modules 351, and optional fully connected layer 335. System 700 may also include or implement any modules, layers, or components as discussed herein. Memory storage 703 may store input video, DNN parameters, feature tensors, feature maps, feature vectors, standardized feature maps, normalized feature maps, transform parameters, or any other data discussed herein.

As shown, in some examples, DNN layers 341, DTN modules 351, and optional fully connected layer 335 are implemented via central processor 701. In other examples, one or more or portions of DNN layers 341, DTN modules 351, and optional fully connected layer 335 are implemented via video processor 702, an image processor, a graphics processor, or the like. In yet other examples, one or more or portions of DNN layers 341, DTN modules 351, and optional fully connected layer 335 are implemented via an video processing pipeline or unit.

Video processor 702 may include any number and type of graphics, image, or video processing units that may provide the operations as discussed herein. In some examples, video processor 702 is a video or image signal processor. For example, video processor 702 may include circuitry dedicated to manipulate video data obtained from memory storage 703. Central processor 701 may include any number and type of processing units or modules that may provide control and other high level functions for system 700 and/or provide any operations as discussed herein. Memory storage 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory storage 703 may be implemented by cache memory.

In an embodiment, one or more or portions of DNN layers 341, DTN modules 351, and optional fully connected layer 335 are implemented via an execution unit (EU) of video processor 702. The EU may include, for example, programmable logic or circuitry such as a logic core or cores that may provide a wide array of programmable logic functions. In an embodiment, one or more or portions of DNN layers 341, DTN modules 351, and optional fully connected layer 335 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of DNN layers 341, DTN modules 351, and optional fully connected layer 335 are implemented via an application specific integrated circuit (ASIC). The ASIC may include an integrated circuitry customized to perform the operations discussed herein. Camera 704 may include any camera having any suitable lens and image sensor and/or related hardware for capturing images or video for input to a CNN as discussed herein.

Returning to discussion of FIG. 6, process 600 begins at operation 601, where a current standardized feature map is received from a particular layer of a deep neural network, such that the current standardized feature map corresponds to a current time stamp of the input video. The deep neural network may include any suitable video recognition model. In some embodiments, the deep neural network is one of a video object detection model, a video action detection model, or a video segmentation model. The particular layer may be any layer of the deep neural network. In some embodiments, the particular layer of the deep neural network is an input layer of the deep neural network. The current standardized feature map may be standardized using any suitable technique or techniques. In some embodiments, process 600 further includes generating the current standardized feature map by standardizing the current feature map based on a mean and a standard deviation estimated using at least a portion of the input video or the current feature map. As used herein, the term standardized feature map indicates a feature map adjusted based on statistical features of the input video and or feature maps of the DNN. In some embodiments, the standardization includes subtracting the mean from each feature and dividing by a square root of a sum of the square of the standard deviation and a small constant, as shown with respect to Equation (1).

Processing continues at operation 602, where current transform parameters are generated for transformation of the current standardized feature map received at operation 601 based on prior transform parameters and one of a current feature vector or a current feature map corresponding to the current standardized feature map, such that the prior transform parameters used to transform a prior standardized feature map to a prior normalized feature map for a prior time stamp of the input video. In some embodiments, the current feature vector is used and process 600 further includes generating the current feature vector by applying global average pooling to the current feature map. In some embodiments, the current transform parameters include a hidden state parameter and a cell state parameter of a meta temporal relay applied to the prior transform parameters and the current feature vector or the current feature map. In some embodiments, transforming the current standardized feature map to the current normalized feature map includes summing the cell state parameter with a product of a first standardized feature of the current standardized feature map and the hidden state parameter. Such processing may be repeated for each standardized feature of the current standardized feature map. In some embodiments, the meta temporal relay includes a mapping from the current feature vector and a prior hidden state to one or more gating mechanisms applied by the meta temporal relay, such that the prior hidden state used to transform the prior standardized feature map to the prior normalized feature map for the prior time stamp of the input video. In some embodiments, the mapping includes a bottleneck mapping structure from the current feature vector and the prior hidden state to the one or more gating mechanisms. In some embodiments, in the transforming the current standardized feature map to the current normalized feature map, the current transform parameters are used in place of the mean and the standard deviation.

Processing continues at operation 603, where the current standardized feature map to a current normalized feature map using the current transform parameters. As discussed, in some embodiments, transforming the current standardized feature map to the current normalized feature map includes summing the cell state parameter with a product of each standardized feature of the current standardized feature map and the hidden state parameter. Notably, in the transforming the current standardized feature map to the current normalized feature map, the current transform parameters are used in place of the mean and the standard deviation. As used herein, the term normalized feature map indicates a feature map having recovered standardized features from a standardized feature map. Such normalization may include a linear transform of the standardized feature map using the cell state parameter and the hidden state parameter such that the hidden state parameter is a linear coefficient and the cell state parameter is an added constant.

Processing continues at operation 604, where a video recognition output is generated based on application of a second layer of the deep neural network subsequent to the particular layer to the current normalized feature map. In some embodiments, such processing is repeated for other layers of the deep neural network. For example, such dynamic temporal normalization may be applied between any layers of a deep neural network such as between convolutional layers, between a convolutional layer and a fully connected layer, or prior to a first convolutional layer of the deep neural network. The video recognition output may be any suitable output such as object, action, or segmentation indicators or probabilities at any level of granularity such as pixel, block, region, or frame level.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity. In some embodiments, a system includes a memory to store any data structure discussed herein and one or more processors to implement any operations discussed herein.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein. In some embodiments, the operations discussed herein are implemented by at least one non-transitory machine readable medium including instructions that, in response to being executed on a device, cause the device to perform such operations.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
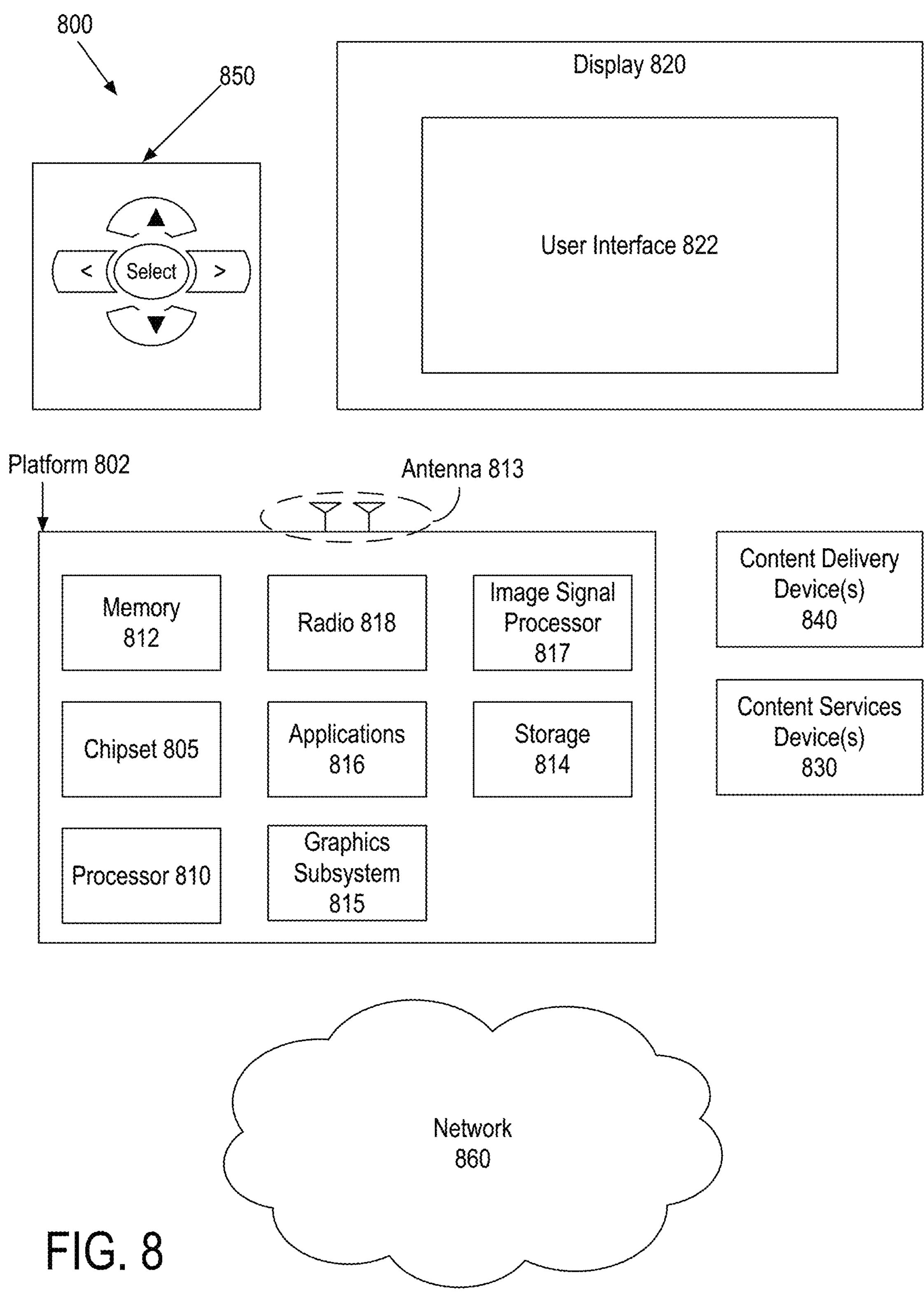
FIG. 8 is an illustrative diagram of an example system.

FIG. 8 is an illustrative diagram of an example system 800, arranged in accordance with at least some implementations of the present disclosure. In various implementations, system 800 may be a mobile system although system 800 is not limited to this context. System 800 may implement and/or perform any modules or techniques discussed herein. For example, system 800 may be incorporated into a personal computer (PC), server, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), network device, edge device, cloud system, and so forth. In some examples, system 700 may be implemented via a cloud computing environment.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Image signal processor 817 may be implemented as a specialized digital signal processor or the like used for image or video frame processing. In some examples, image signal processor 817 may be implemented based on a single instruction multiple data or multiple instruction multiple data architecture or the like. In some examples, image signal processor 817 may be characterized as a media processor. As discussed herein, image signal processor 817 may be implemented based on a system on a chip architecture and/or based on a multi-core architecture.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of navigation controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In various embodiments, navigation controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
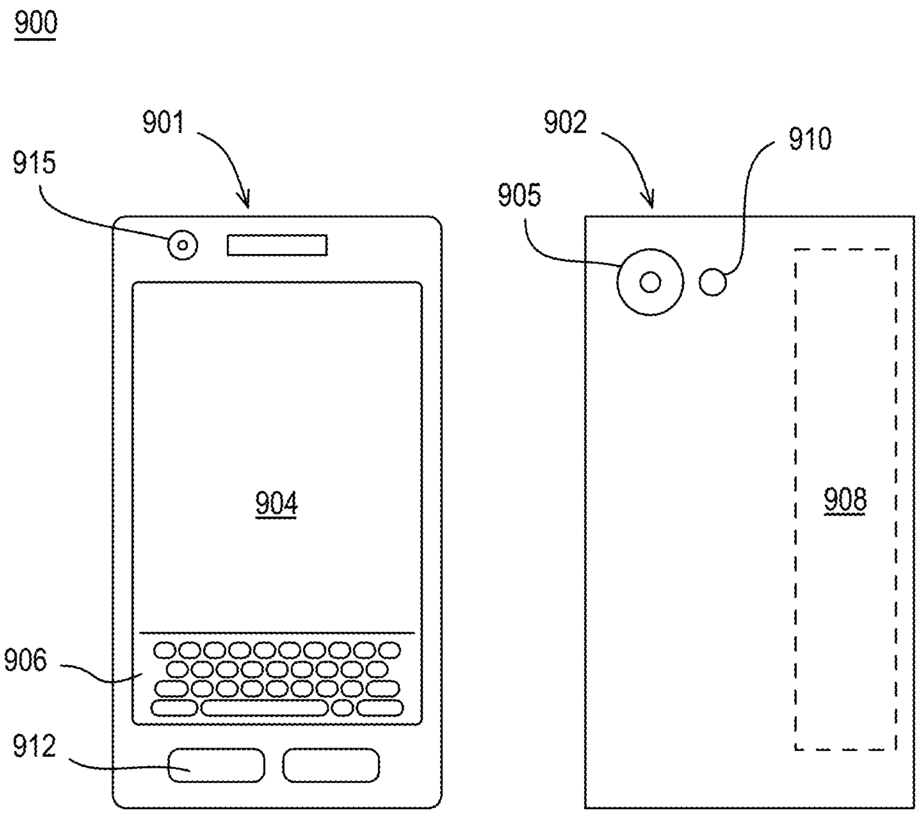
FIG. 9 illustrates an example small form factor device, all arranged in accordance with at least some implementations of the present disclosure.

As described above, system 800 may be embodied in varying physical styles or form factors. FIG. 9 illustrates an example small form factor device 900, arranged in accordance with at least some implementations of the present disclosure. In some examples, system 800 may be implemented via device 900. In other examples, other systems discussed herein or portions thereof may be implemented via device 900. In various embodiments, for example, device 900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 9, device 900 may include a housing with a front 901 and a back 902. Device 900 includes a display 904, an input/output (I/O) device 906, camera 915, a camera 905, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. As shown, device 900 may include camera 905 and a flash 910 integrated into back 902 (or elsewhere) of device 900 and camera 915 integrated into front 901 of device 900. In some embodiments, either or both of cameras 915, 905 may be moveable with respect to display 904. Camera 915 and/or camera 905 may be components of an imaging module or pipeline to originate color image data processed into streaming video that is output to display 904 and/or communicated remotely from device 900 via antenna 908 for example. For example, camera 915 may capture input images and eye contact corrected images may be provided to display 904 and/or communicated remotely from device 900 via antenna 908.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following pertain to further embodiments.

In one or more first embodiments, a method for application of video recognition to input video comprises receiving a current standardized feature map from a particular layer of a deep neural network, the current standardized feature map corresponding to a current time stamp of the input video, generating current transform parameters for linear transformation of the current standardized feature map based on prior transform parameters and one of a current feature vector or a current feature map corresponding to the current standardized feature map, the prior transform parameters used to transform a prior standardized feature map to a prior normalized feature map for a prior time stamp of the input video, transforming the current standardized feature map to a current normalized feature map using the current transform parameters, and generating a video recognition output based on application of a second layer of the deep neural network subsequent to the particular layer to the current normalized feature map.

In one or more second embodiments, further to the first embodiment, the current transform parameters comprise a hidden state parameter and a cell state parameter of a meta temporal relay applied to the prior transform parameters and the current feature vector or the current feature map.

In one or more third embodiments, further to the first or second embodiments, transforming the current standardized feature map to the current normalized feature map comprises summing the cell state parameter with a product of a first standardized feature of the current standardized feature map and the hidden state parameter.

In one or more fourth embodiments, further to any of the first through third embodiments, the meta temporal relay comprises a mapping from the current feature vector and a prior hidden state to one or more gating mechanisms applied by the meta temporal relay, the prior hidden state used to transform the prior standardized feature map to the prior normalized feature map for the prior time stamp of the input video.

In one or more fifth embodiments, further to any of the first through fourth embodiments, the mapping comprises a bottleneck mapping structure from the current feature vector and the prior hidden state to the one or more gating mechanisms.

In one or more sixth embodiments, further to any of the first through fifth embodiments, the method further comprises generating the current standardized feature map by standardizing the current feature map based on a mean and a standard deviation estimated using at least a portion of the input video or the current feature map.

In one or more seventh embodiments, further to any of the first through sixth embodiments, generating the current transform parameters is based on the current feature vector, and the method further comprises generating the current feature vector by applying global average pooling to the current feature map.

In one or more eighth embodiments, further to any of the first through seventh embodiments, in the transforming the current standardized feature map to the current normalized feature map, the current transform parameters are used in place of the mean and the standard deviation.

In one or more ninth embodiments, further to any of the first through eighth embodiments, wherein the deep neural network comprises one of a video object detection model, a video action detection model, or a video segmentation model.

In one or more tenth embodiments, further to any of the first through ninth embodiments, the first layer of the deep neural network is an input layer of the deep neural network.

In one or more eleventh embodiments, a device or system includes a memory and one or more processors to perform a method according to any one of the above embodiments.

In one or more twelfth embodiments, at least one machine readable medium includes a plurality of instructions that in response to being executed on a computing device, cause the computing device to perform a method according to any one of the above embodiments.

In one or more thirteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for application of video recognition to input video, comprising:

a memory to store at least a portion of a current standardized feature map from a current layer of a deep neural network, the current standardized feature map corresponding to a current time stamp of the input video; and one or more processors coupled to the memory, the one or more processors to:

generate current transform parameters for linear transformation of the current standardized feature map based on prior transform parameters and a current feature map corresponding to the current standardized feature map, the prior transform parameters used to transform a prior standardized feature map to a prior normalized feature map for a prior time stamp of the input video;

transform the current standardized feature map to a current normalized feature map using the current transform parameters, wherein the current transform parameters include a hidden state parameter and a cell state parameter of a meta temporal relay applied to the prior transform parameters and the current feature map; and generate a video recognition output based on application of a subsequent layer of the deep neural network to the current normalized feature map, wherein the subsequent layer of the deep neural network is subsequent to the current layer of the deep neural network.

2. The system of claim 1, wherein the one or more processors to transform the current standardized feature map to the current normalized feature map comprises the one or more processors to sum the cell state parameter with a product of a first standardized feature of the current standardized feature map and the hidden state parameter.

3. The system of claim 1, wherein the meta temporal relay comprises a mapping from a current feature vector and a prior hidden state to one or more gating mechanisms applied by the meta temporal relay, the prior hidden state used to transform the prior standardized feature map to the prior normalized feature map for the prior time stamp of the input video.

4. The system of claim 3, wherein the mapping comprises a bottleneck mapping structure from the current feature vector and the prior hidden state to the one or more gating mechanisms.

5. The system of claim 1, the one or more processors to:

generate the current standardized feature map by standardizing the current feature map based on a mean and a standard deviation estimated using at least a portion of the input video or the current feature map.

6. The system of claim 5, wherein the one or more processors to generate the current transform parameters is based on a current feature vector, the one or more processors to: generate the current feature vector by applying global average pooling to the current feature map.

7. The system of claim 5, wherein, in the linear transformation of the current standardized feature map to the current normalized feature map, the current transform parameters are used in place of the mean and the standard deviation.

8. The system of claim 1, wherein the deep neural network comprises one of a video object detection model, a video action detection model, or a video segmentation model.

9. The system of claim 1, wherein the current layer of the deep neural network is an input layer of the deep neural network.

10. A method for application of video recognition to input video, comprising:

receiving a current standardized feature map from a current layer of a deep neural network, the current standardized feature map corresponding to a current time stamp of the input video;

generating current transform parameters for linear transformation of the current standardized feature map based on prior transform parameters and a current feature map corresponding to the current standardized feature map, the prior transform parameters used to transform a prior standardized feature map to a prior normalized feature map for a prior time stamp of the input video;

transforming the current standardized feature map to a current normalized feature map using the current transform parameters, wherein the current transform parameters include a hidden state parameter and a cell state parameter of a meta temporal relay applied to the prior transform parameters and the current feature map; and generating a video recognition output based on application of a subsequent layer of the deep neural network to the current normalized feature map, wherein the subsequent layer of the deep neural network is subsequent to the current layer of the deep neural network.

11. The method of claim 10, wherein transforming the current standardized feature map to the current normalized feature map comprises summing the cell state parameter with a product of a first standardized feature of the current standardized feature map and the hidden state parameter.

12. The method of claim 10, wherein the meta temporal relay comprises a mapping from a current feature vector and a prior hidden state to one or more gating mechanisms applied by the meta temporal relay, the prior hidden state used to transform the prior standardized feature map to the prior normalized feature map for the prior time stamp of the input video.

13. The method of claim 12, wherein the mapping comprises a bottleneck mapping structure from the current feature vector and the prior hidden state to the one or more gating mechanisms.

14. At least one non-transitory machine readable medium comprising machine-readable instructions that, in response to being executed on a device, cause the device to apply video recognition to input video by:

receiving a current standardized feature map from a current layer of a deep neural network, the current standardized feature map corresponding to a current time stamp of the input video;

generating current transform parameters for linear transformation of the current standardized feature map based on prior transform parameters and a current feature map corresponding to the current standardized feature map, the prior transform parameters used to transform a prior standardized feature map to a prior normalized feature map for a prior time stamp of the input video;

transforming the current standardized feature map to a current normalized feature map using the current transform parameters, wherein the current transform parameters include a hidden state parameter and a cell state parameter of a meta temporal relay applied to the prior transform parameters and the current feature map; and generating a video recognition output based on application of a subsequent layer of the deep neural network to the current normalized feature map, wherein the subsequent layer of the deep neural network is subsequent to the current layer of the deep neural network.

15. The at least one non-transitory machine readable medium of claim 14, wherein transforming the current standardized feature map to the current normalized feature map comprises summing the cell state parameter with a product of a first standardized feature of the current standardized feature map and the hidden state parameter.

16. The at least one non-transitory machine readable medium of claim 14, wherein the meta temporal relay comprises a mapping from a current feature vector and a prior hidden state to one or more gating mechanisms applied by the meta temporal relay, the prior hidden state used to transform the prior standardized feature map to the prior normalized feature map for the prior time stamp of the input video.

17. The at least one non-transitory machine readable medium of claim 16, wherein the mapping comprises a bottleneck mapping structure from the current feature vector and the prior hidden state to the one or more gating mechanisms.

* * * * *